Dec. 24, 1968     T. J. BINNALL ET AL     3,417,437

SPRING WIRE HOSE CLAMP AND FORM POST FOR MAKING SAID CLAMP

Filed June 24, 1966     2 Sheets-Sheet 1

INVENTORS
Thomas J. Binnall
& Walter E. Surko, Jr.

BY Lowry & Rinehart

ATTORNEYS

Dec. 24, 1968    T. J. BINNALL ET AL    3,417,437
SPRING WIRE HOSE CLAMP AND FORM POST FOR MAKING SAID CLAMP
Filed June 24, 1966    2 Sheets-Sheet 2
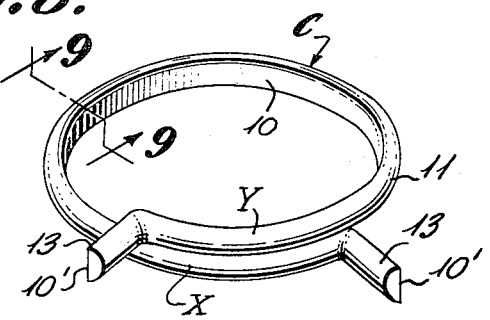
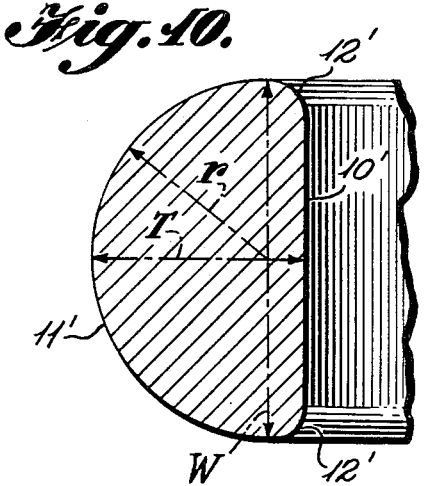
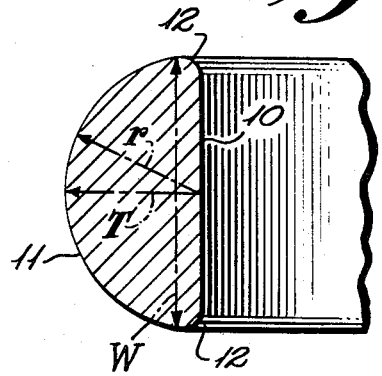
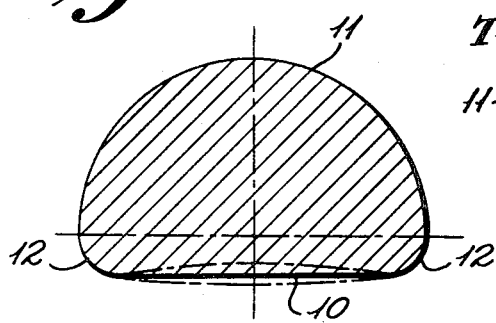
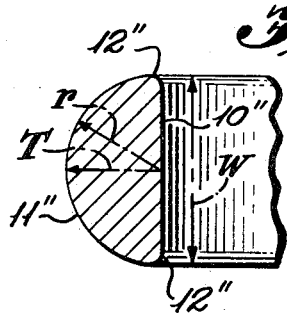
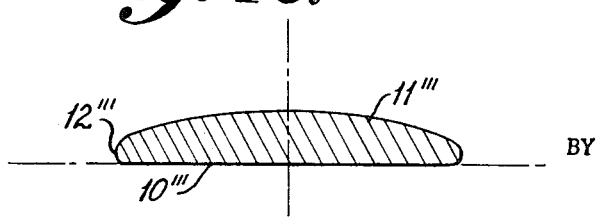
INVENTORS
Thomas J. Binnall &
Walter E. Surko, Jr.
BY Lowry & Rinehart
ATTORNEYS

United States Patent Office 3,417,437
Patented Dec. 24, 1968

---

3,417,437
SPRING WIRE HOSE CLAMP AND FORM POST FOR MAKING SAID CLAMP
Thomas Joseph Binnall, Cromwell, and Walter E. Surko, Jr., Kensington, Conn., assignors to Emhart Corporation, Bloomfield, Conn., a corporation of Connecticut
Filed June 24, 1966, Ser. No. 560,228
10 Claims. (Cl. 24—27)

ABSTRACT OF THE DISCLOSURE

A self-tightening, spirally wound, spring wire hose clamp having a substantially flat internal clamping surface and a novel and simplified geometry which is a definite improvement over round wire hose clamps of the prior art. The improvement, in its broadest aspects, lies in the concept of providing a substantially flat internal surface on a spirally wound, self-contracting, spring wire hose clamp, by means of which an unexpectedly improved performance has been obtained. Within this broad concept it has been determined that the best performance is obtained from a wire having a generally D-shaped or generally half-round cross-section and a thickness to width ratio in the range of from 1:1 to 1:7. This improved clamp, therefore, because of its carefully designed cross-section and geometry, shows a substantial increase in holding power under high pressure, resulting in less leakage; less tendency to clamp breakage; reduced permanent damage to the hose being clamped; and a greater reserve spring force when the clamp is in use. The invention further involves an improved form post, or core, for use in bending and forming the clamp to the required carefully developed configuration.

---

*Background and objects of the invention*

Spring wire hose clamps of the spirally wound, self-contracting type have had substantial acceptance in the art, and are presently being used by the tens of millions in automotive, appliance, marine, vending machine and other industries. Nevertheless, a continuous effort has been made to improve the performance of these clamps, and to overcome the disadvantages found in the earlier prototypes. Among the principal advantages of this general type of clamp are its simplicity, its economy of manufacture, and the quickness and ease with which it may be applied or removed from its clamping environment.

A number of unexpected and substantial problems have been faced, however, in the attempts to improve the spring wire clamp, the form post for bending the clamp, and the general method of making the clamp. Earlier efforts to solve some of these problems are represented by such prior art patents as 2,685,719; 2,180,271; 2,793,414; 3,008,206; 3,176,726; and 3,113,597.

With the increasing industrial and domestic use of the self-tightening, spring wire hose clamp, certain rather stringent specifications for performance have been developed. For example, in the actual use of the clamps, even for pipe-hose joints of a stated, standard diameter, there is a considerable variation in the actual dimensions of the joint to which the clamp is applied. Therefore, a clamp of a given nominal diameter must be capable of clamping properly within a range of diameters on either side of the nominal diameter. A test commonly applied in the art is that when the clamp is on any diameter gage within a prescribed range, a wire of X diameter should not pass between the gage and the clamp when the wire is inserted at any point in a direction parallel to the axis of the gage.

Further, there is the problem of permanent clamp set when the clamp has been expanded to a maximum diameter and is then allowed to return to a relaxed, non-use dimension. Defined otherwise, if the clamp is expanded to its maximum A use diameter and is then allowed to return to a relaxed, non-use diameter, this relaxed diameter must not be greater than a prescribed diameter D, known in the art as a "No-Go" diameter. For example, the following performance table applied to a standard "Corbin" A–15 round wire hose clamp of the prior art:

TABLE I

Performance and acceptance diameter range:
Nominal wire diameter, A–15 _____ .122
    A max. _____ .968
    B nom. _____ .938
    C min. _____ .906
    D no-go _____ .855
    X–gaging wire max. _____ .008

When such a clamp is applied to any diameter gage between .906 and .968 inch, it must not, for acceptable performance, pass a gaging wire X between the clamp and the gage of a diameter greater than .008 inch. When the clamp has been expanded to its maximum A diameter, or .968 inch, it must return when relaxed to a diameter of no greater than D diameter, or .855 inch.

Thus, in order to have a commercially acceptable clamp, it is necessary to provide a clamp which (1) will have full 360° contact with the hose throughout a specified range of diameters, (2) will apply substantially uniform clamping force completely around the hose throughout said range of diameters, and (3) will not exceed the permissible increase in its free state diameter after expansion to its maximum specified size.

A further goal in the improvement of the spring wire clamp is to increase the holding power of the clamp under substantially increased internal fluid pressure with minimum permanent damage and deformation to the wall of the hose being clamped. A further desirable goal is to produce a clamp capable of an increased applied force without substantially increasing the amount of metal stock used, or the overall dimensions of the clamp including the projecting tangs.

It is therefore an object of the present invention to provide an improved clamp which has a greatly increased holding capability against internal fluid pressure; which forms a tighter seal, the force of the clamp being uniformly distributed over a wider surface area of the hose and in the proper direction; which reduces permanent deformation of the resilient hose; and which prevents penetration of the clamp into the hose to the point where there is little reserve spring action, and thus reduced clamping force.

Still another object is to provide a clamp of greater holding force than prior clamps, wherein the cross-sectional area of the wire is increased without the otherwise expected disadvantage experienced in round wire clamps of an increase in the tendency of the clamp to take a permanent set upon expansion to or beyond A max. diameter.

Another object of the invention is to provide a clamp of simplified geometry which has, at the same time, improved holding capability and resistance to setting.

Still another object of the invention is to provide an improved and more efficient form post or core for commercially bending and making the improved clamp.

A further object of the invention is to provide a stronger clamp than those previously available, which may be handled with an ordinary pair of pliers and which has a lower profile than the prior art clamps for more efficient use in close areas.

While the preferred and most highly refined embodiment of the invention utilize a wire having a cross-sectional shape that is generally D-shaped or generally half-round, it should be understood that the invention in its broader aspects contemplates the use of varying cross-sectional shapes, the essential elements of the invention being otherwise present.

Description of the invention

With the above and other objects in view, as will be presently apparent, the invention consists in the detailed arrangement of parts as shown in the accompanying drawings and hereinafter described;

In the drawings,

FIGURE 8 is an isometric view of the improved hose clamp in a relaxed condition of non-use;

FIGURE 9 is an enlarged cross-sectional fragmentary view taken on the line 9—9 of FIGURE 8;

FIGURE 10 is a view similar to that of FIGURE 9, but showing a slightly modified cross-sectional shape involving a different thickness to width ratio;

FIGURE 11 is a view presenting still another modification in cross-sectional shape and thickness to width ratio;

FIGURE 12 is a cross-sectional view showing how the internal surface may vary slightly from the flat, planar shape of FIGURES 9, 10 and 11 without departing from the inventive concept; and FIGURES 13 is a view presenting another modification in cross-sectional shape, illustrating still another thickness to width ratio.

Figure 1:
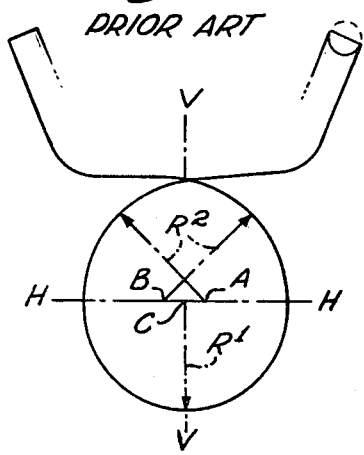
FIGURE 1 is a schematic view showing a typical round wire hose clamp of the prior art, this view being provided for the purpose of a clear comparison of the prior art with a clamp of the present invention.

With specific and detailed reference to FIGURE 1 of the drawings, there is shown for the purposes of clear comparison a schematic view of a round wire spring clamp of the prior art, such as is found in U.S. Patent No. 2,793,414. This clamp is formed from intersecting arcs having three centers of curvature A, B and C spaced along the center line H—H, and two lengths of radii $R_1$ and $R_2$. The center of curvature C is on the vertical center line V—V. This geometry of the schematic view applies to the clamp in its relaxed, non-use position, and in expanded, use position the clamp assumes a substantially circular shape.

Figure 2:
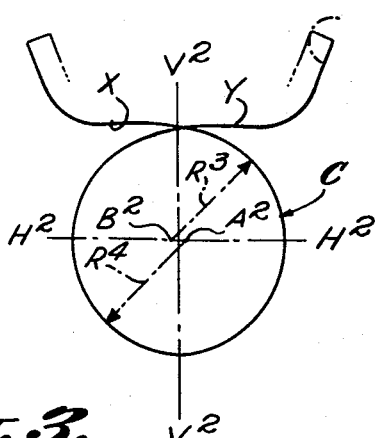
FIGURE 2 is a schematic view designed to provide a clear showing of the geometrical configuration of the clamp of the present invention.

The schematic view of FIGURE 2 shows the geometry of the new and improved clamp provided by the present invention, and it will be noted that this is a much simplified geometry; instead of three centers of curvature, as shown in FIGURE 1, only two centers $A^2$ and $B^2$ are required, these being located on horizontal center line $H^2$—$H^2$, equally spaced from the vertical center line $V^2$—$V^2$. It is important to note that the overlapping portions X and Y of the new clamp (FIGURES 2 and 8) are curved and have a radius which increases at a constant rate as the distance from the center line $V^2$—$V^2$ increases, thereby insuring full contact of the clamp with the hose throughout the area of overlap at all clamping diameters, which result in maximum holding capability.

The improved cross-sectional shape in its several modifications is shown in the enlarged views of FIGURES 6, 9, 10, 11 and 12. The clamp has a substantially flat inner portion 10, an arcuate outer wall 11, and rounded edges 12 joining the two portions 10 and 11. The clamp further has bent out tangs 13, the flat surface 10 becoming the outer, tool-engaging surface 10' of the tangs.

In the FIGURE 9 view is shown a preferred effective cross-sectional shape of the clamp. The center for the radius r is spaced from the inner portion 10 a very slight distance, and the thickness to width (T-W) ratio is approximately 1 to 2, the thickness being taken in a radial direction of said clamp and the width being taken in the axial direction of said clamp, as indicated by the letters T and W, respectively, and the arrows of FIGURE 9.

In the modification of FIGURE 10, the center of radius r is spaced a substantial distance from the inner portion 10', and the T-W ratio is approximately 1 to 1.7.

In the FIGURE 11 modification, the center of the radius r coincides with the inner portion 10", and the T-W ratio is 1 to 2.

In the carrying out the invention, it is only necessary that the surface or inner portion 10 be substantially flat. As shown in FIGURE 12, this surface may be made slightly concave or convex without departing from the inventive concept involved.

Figure 5:
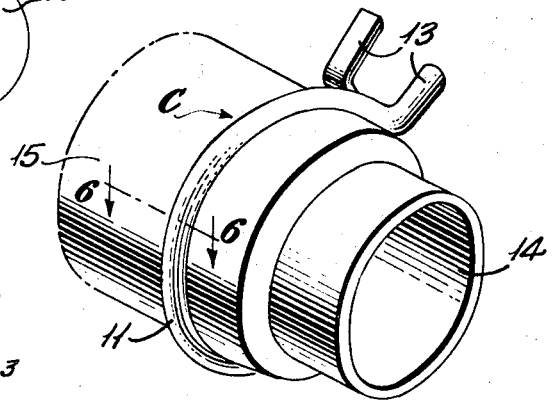
FIGURE 5 is a view showing the clamp of the present invention as applied to a pipe and hose joint.

FIGURE 5 of the drawings shows the clamp as applied to a standard pipe and hose joint. The rigid pipe 14 fits closely within the hose 15 of rubber, plastic or other resilient material. The clamp C is applied over the telescoped members 14 and 15, compressing the resilient material to form a tight seal.

Figure 6:
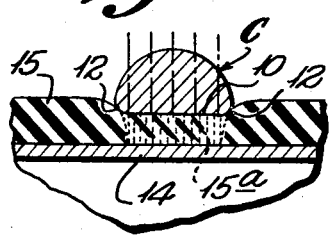
FIGURE 6 is an enlarged fragmentary view taken on the line 6—6 of FIGURE 5.
Figure 7:
FIGURE 7 is a fragmentary view similar to that of FIGURE 6, but showing a spring wire clamp of the prior art as applied to a pipe and hose joint.

The improved manner in which the sealing forces are applied with the novel clamp is shown in FIGURE 6, as compared with the application of forces occurring in the round wire clamp of the prior art, found in FIGURE 7. It will be noted in FIGURE 6 that the flat inside surface 10 provides a larger area of contact with the hose 15 and forces a larger area of the hose into contact with the pipe 14. At the same time, the rounded edges 12 prevent cutting and damage of the hose 15. The result is a greater holding capability under pressure than that possessed by the round wire clamp of the same size. The dotted line area 15a of the hose 15 (FIGURE 6) shows an even distribution of the forces over a larger area. As contrasted with this, FIGURE 7 shows how, in the prior art clamp, the force is concentrated at the midline of the clamp and decreased on either side of the mid-line.

A further effect of the distributed forces 15a is that the clamp will not penetrate as deeply into the hose 15 as does the round wire clamp, and the present clamp remains expanded to its best force holding diameter with ample reserve spring action, and with less permanent and destructive deformation of the resilient hose 15.

For a D-wire clamp of equivalent size to the "Corbin" A-15 round wire clamp of Table I, there is a cross-sectional area of .0159 square inch, as compared with .0117 square inch of the round wire clamp, or an increase of approximately 34.2%. The present clamp is, therefore, stronger and will close with greater force. The thickness of the clamp is, however, approximately 18% less than that of the round wire clamp. This means that the clamp will show less permanent change in diameter after expansion since the amount of set is a function of the wire thickness divided by the mean diameter of the clamp.

The hose clamps of the present invention were tested on standard heater hose and beaded fittings which are used in automobile heater systems of a large automotive manufacturer. The testing apparatus recirculated water at temperatures of 170° F. to 180° F. under variable pressure through the fitting with the test clamps in place. All clamps were attached by expanding them over the bead on the fitting. The pressure was increased until the hose blew off the fitting or burst. Each test was made on a fresh section of hose.

Tests thus made with the standard "Corbin" A–15 hose clamp of Table I showed that the hose blew off the fitting at an average pressure of 91 p.s.i., with a low figure of 77 p.s.i. and a high of 105 p.s.i. In each case the hose blew off the fitting before the pressure was high enough to rupture the hose.

In tests run with the clamps of the present invention, the holding force of the clamps exceeded the strength of the hose in 45% of the cases tested. The hose ruptured at an average of 116 p.s.i., with a low of 115 p.s.i. and a high of 120 p.s.i. The hose blew off the fitting at an average of 118 p.s.i., with a low of 100 p.s.i. and a high of 125 p.s.i. Thus, there is an increase in holding strength of 30% over the "Corbin" A–15 round wire hose clamp of Table I.

All of the above tests were conducted within two or three minutes after the clamp was affixed to the hose. Under these test conditions, additional holding strength that will result after the clamp has been on the hose for fifteen minutes or greater cannot be measured, since the hose will rupture before the holding strength of the clamp is exceeded.

A second test, therefore, was set up, using special fittings with a reduced bead, standard heater hose, and oil at room temperature as the fluid. Under these conditions, the hose did not rupture, and a comparison could be made between the holding strengths of the new and prior art clamps when the clamps had each been on the hose for fifteen minutes or more. These tests showed that the present clamp had an increased holding strength over the round wire clamp of equivalent size in the amount of 40%.

Figure 3:
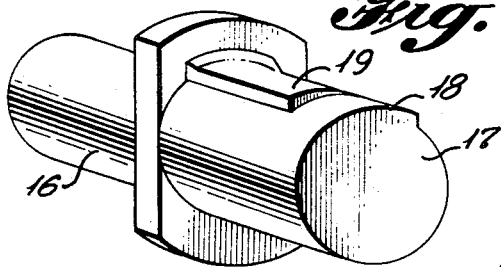
FIGURE 3 is an isometric view of the improved form post, or core, of the present invention.
Figure 4:
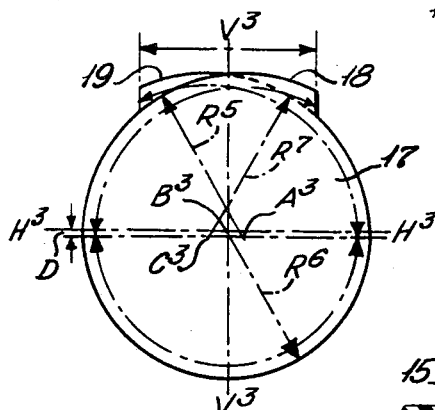
FIGURE 4 is an end view of the form post shown in FIGURE 3.

The improved form posts for forming a hose clamp of the geometry of FIGURE 2 is shown in FIGURES 3 and 4 of the drawings. The form post is the key part of a bending apparatus which is well known in the art and which does not form a part of the present invention. A typical method and apparatus with which the form post of the present invention is used for bending a spring wire clamp is shown in prior U.S. Patent No. 3,176,726.

The form post, as illustrated in FIGURE 3, is a stationary die about which a specified length of wire is formed to produce the required configuration for a spirally wound spring-wire hose clamp of the geometrical configuration of FIGURE 2.

The cylindrical shank 16 of the form post is the part that is supported in the frame of the machine, and the bending is done by four equi-spaced forming tools (not shown) which move in a plane perpendicular to the center line or longitudinal axis of the form post. The cylindrical portion 17 represents the head about which the wire is bent. The ramp 18 receives one leg X of the spring wire. The ramp 19 receives and forms the leg Y of the spring wire. Except for the bend of the tangs, the shape of the hose clamp, including the overlapping portion, is a result of the shape of the form post.

In order to accommodate for springback and for the physical and chemical properties of the wire, the centers $A^3$, $B^3$ and $C^3$ do not coincide with the centers $A^2$ and $B^2$ of the clamp in its relaxed form. The center $B^3$ of the radius $R^6$ is at the intersection of the center lines $V^3$ and $H^3$. The center $A^3$ of the radius $R^5$ is to the right of the center line $V^3$ and on an offset line at a distance D below the center line $H^3$. The center $C^3$ of the radius $R^7$ is to the left of center line $V^3$ and on the same offset line as the center $A^3$. When the clamp has been formed, and springback has occurred, the clamp should have the geometric shape shown in FIGURE 2. If the final product does not fall within the acceptable range when checked dimensionally or physically against the desired geometric shape of FIGURE 2, whether due to springback during forming or changes during hardening, then slight changes are made by grinding the form post to secure the desired results.

While there have been described and shown herein the preferred forms of the novel hose clamp and form post for making the same, it is to be understood that minor changes may be made without departing from the spirit and scope of the invention as claimed.

We claim:
1. A self tightening hose clamp for application to a hose of a predetermined diameter comprising
   a spirally wound body portion formed of a single convolution of spring wire and having overlapping ends terminating in tool engaging portions,
   the internal hose engaging surface of said body portion being substantially flat, and
   the ratio of the thickness of said body portion, taken in a radial direction of said clamp, to the width of the flat, taken in an axial direction of the clamp, being in the range of from 1:1 to 1:7, whereby the strength of said clamp is materially increased over a conventional clamp with only a moderate increase in cross-sectional area and whereby when the clamp is expanded in application to its given maximum use diameter, the said clamp will show less permanent change in diameter than a conventional spring wire clamp, retaining its prescribed no-go diameter.

2. A hose clamp as set forth in claim 1, wherein the said ratio is 1 to 2.

3. A hose clamp as set forth in claim 1, wherein the said ratio is approximately 1 to 1.7.

4. A self tightening hose clamp for application to a hose of a predetermined diameter, comprising
   a spirally wound body portion formed of a single convolution of spring wire and having overlapping ends terminating in toll engaging portions,
   said body portion and said overlapping ends being generally partially rounded in cross-section, with the arcuate portion being directed outwardly and the internal hose engaging surface being substantially flat,
   the ratio of the thickness of said body portion, taken in a radial direction of said clamp, to the width thereof, taken in an axial direction of the clamp, being in the range of from 1:1 to 1:7, whereby the strength of said clamp is materially increased over a conventional clamp with only a moderate increase in cross-sectional area and whereby when the clamp is expanded in application to its given maximum use diameter, the said clamp will show less permanent change in diameter than a conventional spring wire clamp, retaining its prescribed no-go diameter.

5. A self tightening hose clamp for application to a hose of a predetermined diameter comprising
   a spirally wound body portion loop formed of a single convolution of spring wire and having overlapping ends terminating in tool engaging portions,
   said body portion and said overlapping ends being generally partially rounded in cross-section, with the arcuate portion being directed outwardly and the internal hose engaging surface being substantially flat,
   said body portion loop having vertical and horizontal intersecting center lines, said loop being generated by a first radius acting through an arc from the vertical center line through substantially 180° back to the vertical center line about a center on said horizontal center line spaced from and behind said vertical center line, and by a second radius acting in the opposite direction to said first radius through an arc from said vertical center line substantially 180° back to said vertical center line about a center on said horizontal center line spaced from and behind said center line.

6. A self tightening hose clamp for application to a hose of a predetermined diameter comprising
   a spirally wound body portion loop formed of a single convolution of spring wire and having overlapping ends terminating in tool engaging portions, the internal hose engaging surface of said body portion being substantially flat and the ratio of the thickness of said body portion, taken in a radial direction of said clamp, to the width of the flat, taken in an axial direction of the clamp, being in the range of from 1:1 to 1:7, said body portion loop having vertical and horizontal intersecting center lines, said loop being generated by a first radius acting through an arc from the vertical center line through substantially 180° back to the vertical center line about a center on said horizontal center line spaced from and behind said vertical center line, and by a second radius acting in the opposite direction to said first radius through an arc from said vertical center line substantially 180° back to said vertical center line about a center on said horizontal center line spaced from and behind said center line.

7. A self tightening hose clamp for application to a hose of a predetermined diameter comprising a spirally wound body portion loop formed of a single convolution of spring wire and having overlapping ends terminating in tool engaging portions, the ratio of the thickness of said body portion, taken in a radial direction of said clamp, to the width thereof, taken in an axial direction of the clamp, being in the range of from 1:1 to 1:7, said body portion loop having vertical and horizontal intersecting center lines, said loop being generated by a first radius acting through an arc from the vertical center line through substantially 180° back to the vertical center line about a center on said horizontal center line spaced from and behind said vertical center line, and by a second radius acting in the opposite direction to said first radius through an arc from said vertical center line substantially 180° back to said vertical center line about a center on said horizontal center line spaced from and behind said center line.

8. A self tightening hose clamp for application to a hose of a predetermined diameter, comprising a spirally wound body portion loop formed of a single convolution of spring wire having overlapping ends terminating in generally radially directed tangs, said body portion and said overlapping ends being generally partially rounded in cross-section, with the arcuate portion being directed outwardly and the internal hose engaging surface being substantially flat, said body portion loop having vertical and horizontal intersecting center lines, said loop being generated by a first radius acting through an arc from the vertical center line through substantially 180° back to vertical center line about a center on said horizontal center line spaced from and behind said vertical center line, and by a second radius acting in the opposite direction to said first radius through an arc from said vertical center line substantially 180° back to said vertical center line about a center on said horizontal center line spaced from and behind said center line.

9. A hose clamp as set forth in claim 8, wherein said centers are equally spaced from said vertical center line and said radii are substantially equal in length.

10. In a form post for spring clamps, said post having a projecting forming head of a closed, generally oval configuration in cross-section and oppositely directed ramps which are spaced axially along said head for forming the overlapping legs of said clamp, the improvement wherein said cross-section of said forming head has horizontal and vertical center lines and an offset line substantially parallel to and below said horizontal center line, and said oval configuration is generated by a first radius acting about a center at the intersection of said vertical and horizontal center lines and moving through an arc below said horizontal center line of less than 180° from offset line to offset line; a second radius acting about a center on said offset line to one side of said vertical center line through an arc above said offset line greater than 90° but less than 180° starting from one side of said offset line; and a third radius acting about a center on said offset line on the opposite side of said vertical center line from the center of said second radius through an arc above said offset line greater than 90° but less than 180° starting from the other side of said offset line from that of said second radius.

References Cited

UNITED STATES PATENTS

| 298,962 | 5/1884 | Ford | 24—20 |
| 3,176,726 | 4/1965 | Meese et al. | 140—80 |
| 2,081,677 | 5/1937 | O'Neill | 24—256 X |
| 2,793,414 | 5/1957 | Arras | 24—27 |
| 3,008,206 | 11/1961 | Meese et al. | 24—27 |

FOREIGN PATENTS

| 461,048 | 2/1937 | Great Britain. |
| 441,865 | 1/1936 | Great Britain. |

DONALD A. GRIFFIN, *Primary Examiner.*

U.S. Cl. X.R.

140—80